United States Patent [19]

Cockman, Jr.

[11] 4,200,167
[45] Apr. 29, 1980

[54] SAFETY INTERLOCK SYSTEM FOR A SCHOOL BUS DOOR OR THE LIKE

[76] Inventor: Euliss C. Cockman, Jr., Rte. 1, Box 104-B, Carthage, N.C. 28327

[21] Appl. No.: 968,495

[22] Filed: Dec. 11, 1978

[51] Int. Cl.$^2$ ............................................. B60R 18/00
[52] U.S. Cl. ....................................... 180/281; 49/31; 49/356
[58] Field of Search ................. 180/271, 281; 49/141, 49/356, 357, 31; 296/146; 160/188, 189

[56] References Cited

U.S. PATENT DOCUMENTS

| | | | |
|---|---|---|---|
| 2,674,334 | 4/1954 | Uberbacher | 180/281 |
| 3,575,604 | 4/1971 | Smith | 180/281 |
| 3,961,660 | 6/1976 | Vinci | 49/356 |
| 4,010,814 | 3/1977 | Adams | 180/271 |

*Primary Examiner*—John J. Love
*Assistant Examiner*—D. W. Underwood
*Attorney, Agent, or Firm*—Mills & Coats

[57] ABSTRACT

The present invention relates to a safety interlock system that is associated with the door of a vehicle such as the door of a school bus, and which assures that the door of the vehicle is not inadvertently open and that certain safe conditions exist before the door can be opened. The safety interlock system comprises an electrically actuated locking mechanism, that includes a manual override, for locking the door handle of the vehicle. Forming a part of the safety interlock system along with the locking mechanism is an array of switch control means, all of which must be simultaneously actuated in order to unlock and release the door handle in order that the door be opened. First, the array of switch control means includes two independent switches that must be actuated by two separate individuals, preferably the driver of the vehicle and another individual such as the passenger or a monitor. In addition in a preferred embodiment, the array of switch control means includes at least one switch that is dependent upon and responsive to the velocity of the vehicle, and in particularly, is only actuated when the vehicle assumes a stationary position as evidenced by the brakes being applied and/or the transmission being placed in a neutral position.

15 Claims, 6 Drawing Figures

SAFETY INTERLOCK SYSTEM FOR A SCHOOL BUS DOOR OR THE LIKE

The present invention relates to door actuating systems for school buses, and more particularly to a safety interlock system for a passenger vehicle such as a school bus for assuring safe conditions prior to the opening of the vehicle door for entry or exit therefrom.

BACKGROUND OF INVENTION

In recent years, there has been an increase in school bus related injuries and fatalities, and many of these injuries and fatalities occur while children are exiting a school bus. In some cases, it has been found that the school bus door was opened by the passenger or some other individual before the school bus had reached a complete stop. In addition in other cases, it has been found that the door was opened after the bus had reached a complete stop, but before the driver could check and make sure that all following and oncoming traffic had stopped. In most, if not all, of these cases, the resulting injury or fatality could have been avoided if proper safety precautions had been taken.

SUMMARY OF INVENTION

The present invention relates to a safety interlock system that is cooperative with the door handle of a school bus or other such type of vehicle, and which basically functions to assure that the vehicle door is not open unless certain safety conditions exist. In the preferred embodiment disclosed herein, one such safe condition that must exist before the safety interlock system of the present invention will release the door handle is that the vehicle be in a stationary or stopped position. In addition, to assure that conditions are safe for entry or exit, the safety interlock system includes at least two independently actuated control switches that must be simultaneously actuated by two separate individuals, one individual preferably being the driver, in order to allow the door handle to be released.

Briefly describing the principal aspects of the present invention, the safety interlock system comprises an electrical circuit which is operatively connected to the vehicle in order to derive power therefrom, and which includes an electrically actuated solenoid unit that is operative to actuate a locking pin between a locked and unlocked position. Electrically connected in the circuit is an array of control switches that are disposed in series relationships such that each of the selected array of switches must be actuated in order for the solenoid unit to actuate the locking pin from the locked to the unlocked position.

In the preferred embodiment disclosed herein, forming a part of the array of switches is at least one switch that is responsive to a velocity condition of the school bus or vehicle. As disclosed herein, this includes the vehicle brake light switch which must be actuated to a closed state, meaning that the brakes of the vehicle or school bus have been applied. In addition, a switch responsive to the state of the vehicle's transmission can be incorporated such that the electrical circuit leading to the solenoid unit can only be actuated when the transmission assumes a neutral position.

Finally, the electrical circuit includes at least two independent control switches in series which requires that the two switches be simultaneously actuated before the solenoid unit can be actuated and the door handle released. Consequently, it is appreciated that in order for the school bus door to be opened, that the vehicle must be in a stopped or stationary position as evidenced by the brakes thereof being applied and the fact that the transmission is in the neutral position. Besides that, the two independent actuated switches must be simultaneously actuated by two separate individuals, one individual preferably being the driver.

Also forming a part of the safety interlock system of the present invention is an override mechanism that allows the safety interlock system to be overridden in cases of emergency, in which case the override mechanism is designed to kill the vehicle engine and to prohibit starting.

It is, therefore, an object of the present invention to provide a safety interlock system for a vehicle such as a school bus door that will generally assure that the door cannot be opened unless certain basic safe conditions exist.

A further object of the present invention is to provide a safety interlock system cooperative with the door handle of a school bus that assures that the door of the school bus is not opened unless the school bus is stationary and two control switches are simultaneously actuated by two separate individuals.

A further object of the present invention is to provide a safety interlock system of the character described above with an override mechanism that is effective upon actuation to make the safety interlock system inoperative.

Another object of the present invention resides in the provision of a safety interlock system of the character described above wherein there is provided control means for killing the engine of the school bus and prohibiting the start-up thereof in response to the actuation of said safety override mechanism.

It is also an object of the present invention to provide a safety interlock system of the character described above wherein the safety interlock system is relatively simple, inexpensive, and reliable.

Other objects and advantages of the present invention will become apparent from a study of the following description and the accompanying drawings which are merely illustrative of the present invention.

DESCRIPTION OF PREFERRED EMBODIMENT

Figure 1:
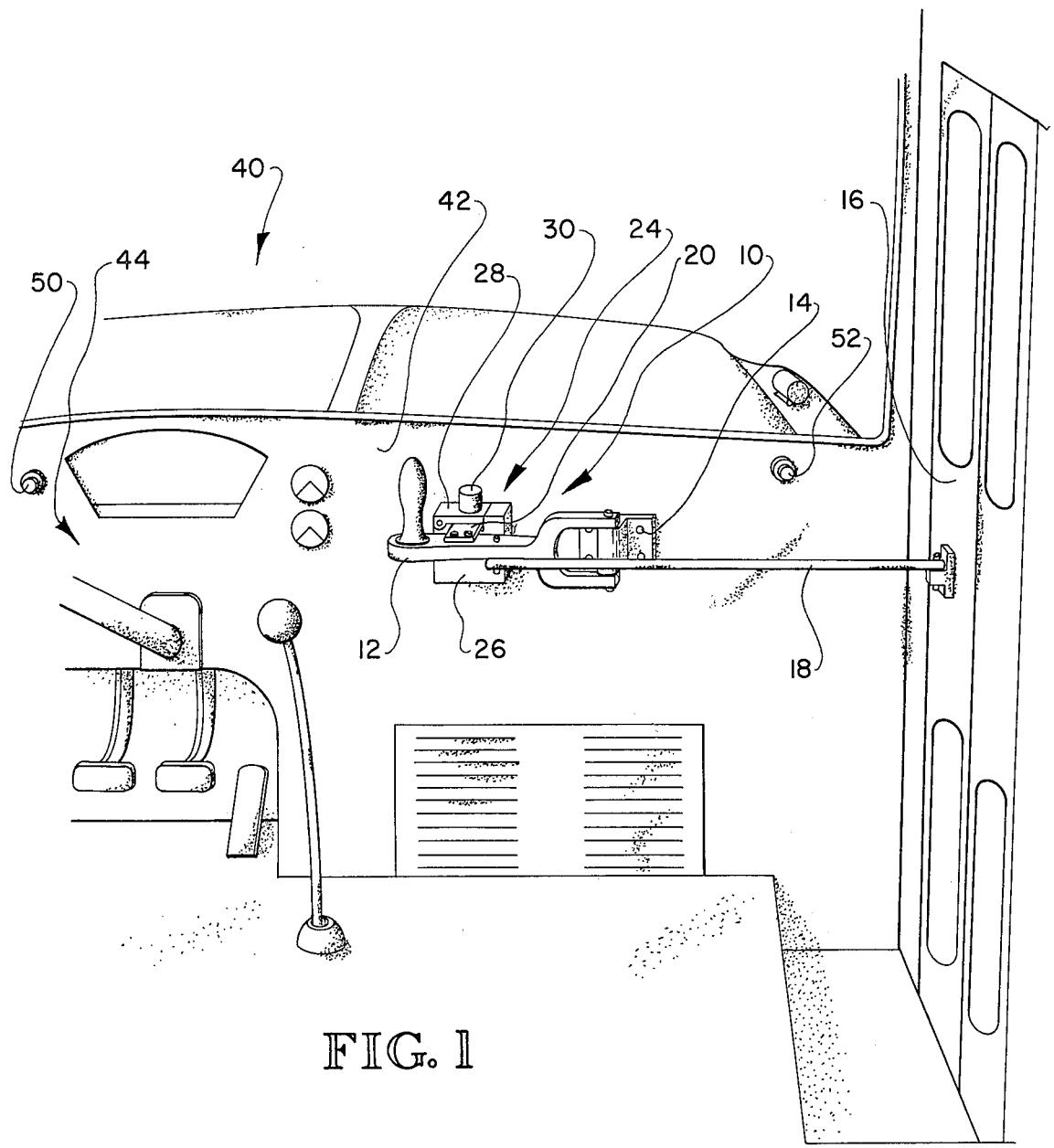
FIG. 1 is a fragmentary perspective view of the dash panel of a school bus having the safety interlock system of the present invention incorporated therein.

With further reference to the drawings, a school bus as indicated generally by the numeral 40 in FIG. 1, and as seen therein includes a dash panel 42 with a driver station 44 situated about the left-hand front side behind the dash panel.

The safety interlock system of the present invention is indicated by the numeral 10 and is associated with a door handle 12 that is mounted to the dash panel 42 by a mounting frame 14. Operatively connected to door handle 12 is an interconnecting linkage 18 that extends from the door handle 12 to the school bus door 16.

Figure 2:
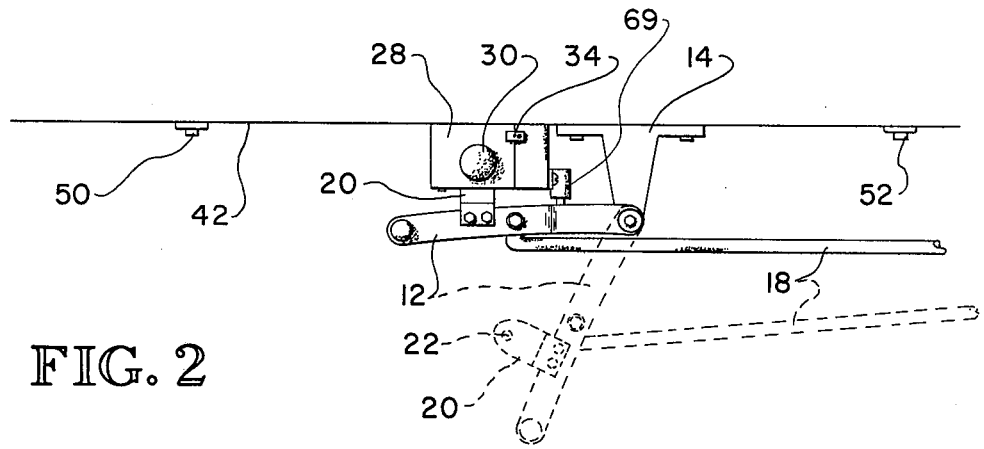
FIG. 2 is a top plan view of the school bus door handle assembly and associated locking mechanism of the safety interlock system of the present invention.

As illustrated in FIG. 2, by swinging door handle 12 counterclockwise from its closed position, shown in full lines in FIG. 2, to the position shown in dotted lines, the interconnecting linkage 18 is adapted to cause door 16 to open. Consequently, it is appreciated, as illustrated in FIG. 2, that door handle 12 is movable between a closed position (full lines) and an open position (dotted lines).

Fixed to the door handle 12 is a locking tongue 20 that projects therefrom and includes an opening 22 formed therein. The leading edge of the locking tongue 20 may be appropriately tapered and even the tongue may be pivotably mounted to the door handle 12 in order that it may appropriately yield when being forced into a locked position. This may be more fully understood from subsequent portions of this disclosure.

The safety interlock system 10 of the present invention is cooperable with the door handle 12 so as to lock the same in its closed position, thereby assuring that the door 16 cannot be inadvertently opened unless the safety interlock system 10 is actuated. Referring to the safety interlock system 10 in more detail, it is seen that the same includes a locking mechanism 24 that is adapted to engage and lock the door handle 12 in a closed position, as shown in full lines in FIG. 2, but which is adapted to release the same upon the occurrence of selected events in order that the door 16 can be opened. Reviewing the locking mechanism 24 in detail, it is seen that the same includes a base support member 26 that serves as a supporting frame structure and which is secured to the dash panel 42 behind the door handle 12. Pivotably mounted to the base support member 26 is a carrier plate 28 that has a solenoid unit 30 secured thereto and which is operatively associated with a locking pin 32 for actuating the same between a locked extended position and an unlocked position in which case the locking pin 32 is pulled to a retracted position.

In the normal mode of operation, the carrier plate 28 assumes an operative position and in such the locking pin is aligned with the locking tongue 20 projecting from the door handle 12. When the door handle 12 assumes a closed position, the locking pin 32 and the solenoid unit 30 should be vertically aligned with the locking tongue 20 such that the locking pin 32 is free to project downwardly within the opening 22 of the locking tongue. This assures that when the door handle 12 is in the closed position and the safety interlock system 10 is not actuated, then the locking pin 32 assumes a locked position in which case it extends into opening 22 so as to assure that door handle 12 is kept in a closed position. The actuation of the solenoid unit 30 causes the locking pin 32 to be retracted and to move vertically from opening 22 such that the locking tongue 20 and door handle 12 is free to be swung from its closed position to its open position, as illustrated in FIG. 2.

Figure 3:
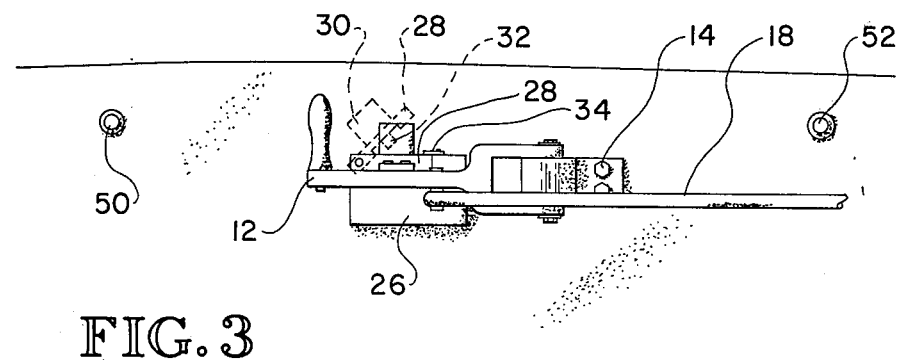
FIG. 3 is a front elevational view of the door handle assembly and associated locking mechanism of FIG. 2.

Carrier plate 28 serves as an override mechanism inasmuch as the same is pivotably mounted to base support member 26 and is generally held in its operative position by a latching post 34 that is secured to base support member 26 and extends therefrom where the same engages an appropriate edge of the carrier plate 28. To cause the entire safety interlock system 10 to be inoperative, the latch post 34 can be released from the carrier plate 28, and the carrier plate can be swung counterclockwise about its pivot axis, as illustrated in FIG. 3, such that the entire solenoid unit 30 and the associated locking pin 32 is removed from engagement with the door handle 12. This assures that the door handle 12 can be manually actuated.

Figure 4:
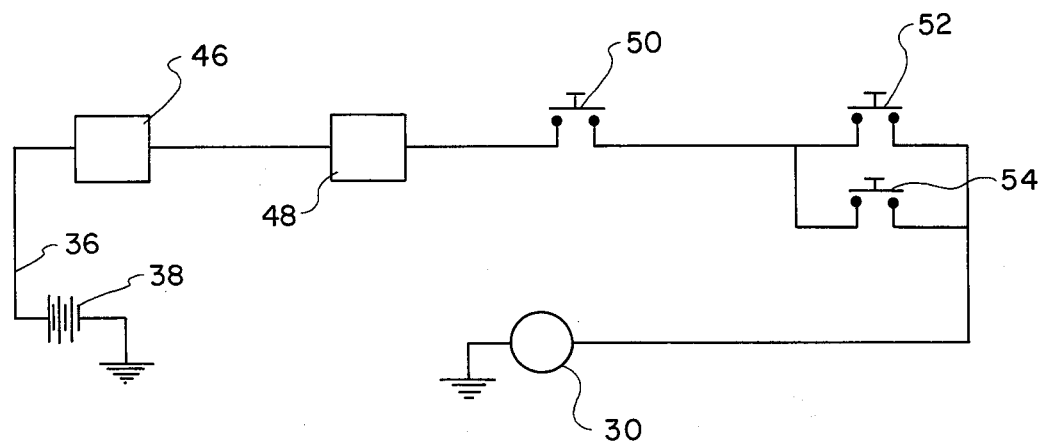
FIGS. 4 through 6 are a series of electrical schematics illustrating various electrial circuits associated with the safety interlock system of the present invention.
Figure 5:
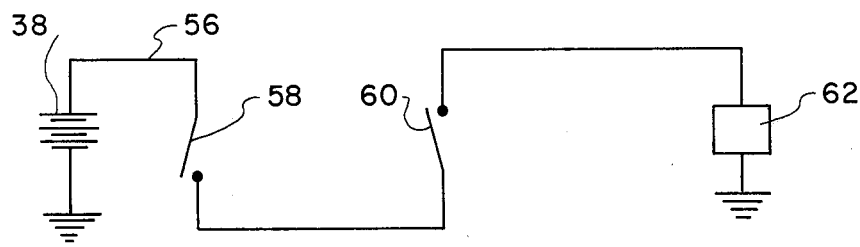
Figure 6:
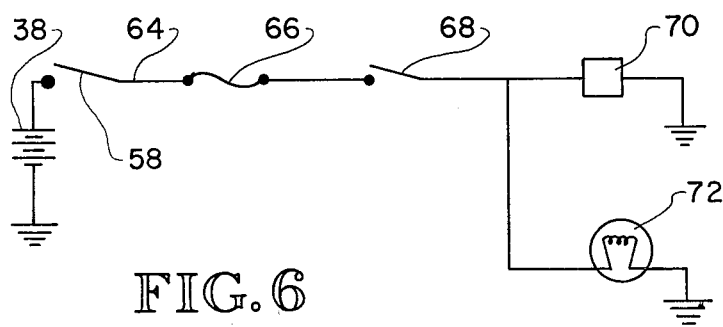

Turning to FIGS. 4 through 6, in FIG. 4, there is disclosed the basic electrical circuit for the safety interlock system 10 of the present invention. It is seen that the same includes an electrical circuit 36 that includes a power supply from the vehicle that is represented by a battery 38.

Electrically connected in this circuit is an array or series of control switches that must be actuated simultaneously in order to actuate the solenoid unit 30.

With respect to the control switches, the first of these to be discussed will be referred to as control switch means that is responsive to the velocity of the school bus or vehicle 40. In this regard, within electrical circuit 36, there is provided a brake light switch 46 and as an optional control, a transmission neutral switch indicated by the numeral 48. Consequently, both of these switches would normally remain open and in the case of the brake light switch 46 would only be closed when the driver of the school bus 40 has applied the brakes. In the case of switch 48, the same would only be closed once the transmission gear shifter is placed in the neutral position.

Electrically connected in series with control switches 46 and 48, is a manually actuated driver control switch indicated by the numeral 50. It is seen that this switch as shown in FIGS. 1 through 3 is placed in close proximity to the driver station 44 such that the switch can be reached by the driver.

In addition, the electrical circuit 36 includes two parallel manually actuated switches 52 and 54 that are disposed as a unit in series with the other control switches just referred to. In this regard, switch 52 is a manually actuated switch that is disposed about the interior of the bus in the vicinity of the door 16, but out of the hand reach of the driver. This assures that the same individual cannot actuate both switch 50 and switch 52. Also, the other switch 54 could preferably be disposed exterior of the school bus in the vicinity of the door in order that a passenger about to enter the school bus 40 could actuate the same. In either case, it is seen that in order to complete the circuit 36 to the solenoid unit 30, that at least one of the two switches 52 or 54 must be actuated.

Therefore, it is appreciated that in a preferred embodiment of the safety interlock system of the present invention, to actuate the solenoid unit 30 to release the door handle 12, first the brake light switch 46 must be actuated, switch 48 must be actuated by the gear shift being in the neutral position, switch 50 must be actuated by the driver, and either switch 52 or 54 must be actuated in order that the solenoid unit 30 is caused to retract the locking pin 32 to its unlocked position. It must be kept in mind that all of these control switches must be simultaneously actuated at the same time in order for this occurrence to happen.

Turning to FIG. 5, a second electrical circuit 56 is shown therein and this could also be associated with the safety interlock system 10 of the present invention. In this regard, the second electrical circuit 56 includes a power supply from the vehicle indicated by the numeral 38, and an ignition switch 58 and an override switch 60 that is operatively responsive to the movement and actuation of the carrier plate 28 such that when the carrier plate 28 is pivoted counterclockwise to an inoperative position, which means that the safety interlock system has been overridden, switch 60 would move from a normally closed to an opened position, thereby killing the vehicle engine since the coil, indicated by the numeral 62, would no longer be receiving current from the power supply 38. Therefore, this means that when the override mechanism is actuated by the selective movement of the carrier plate 28, then the vehicle engine will be killed and in no way can the same be started unless the override mechanism and particularly the carrier plate 28 is placed in its operative position (FIG. 2).

Finally a third electrical circuit is shown in FIG. 6 and this too can optionally form a part of the safety interlock system of the present invention. In this regard, a third electrical circuit 64 is also connected to a power supply 38 of the vehicle and includes the ignition switch 58, a fuse 66 and a signal switch 68 that is normally open when the door handle 12 assumes a closed position, but is responsive to the movement of the door handle 12 so as to close when the door handle is moved from the closed position towards an open position. Electrically connected in circuit 64 is some form of signaling means that informs that the door 16 of the vehicle is open or is being opened. In the case of the embodiment illustrated in FIG. 6, one part of the signal means is a light signal 62 that would preferably be disposed about the exterior of the school bus in order that other vehicles and people outside the bus would be appraised that the door is opened or being opened. It is preferred that a buzzer alarm 70 be connected in the circuit 64 also so as to warn the driver and other individuals within the school bus 40 that the door 16 is open or being opened.

It is thusly appreciated that the safety interlock system 10 of the present invention attempts to assure that before the vehicle door 16 can be open that certain safe conditions exist. To achieve this, in a preferred embodiment, the safety interlock system 10 requires that the school bus be in a stationary position, that the driver has considered the situation and it appears safe to open the door, and that a second individual either the passenger or a monitor has surveyed the situation or at least consented to the door being opened. In one design, as illustrated in FIG. 4, to assure that the vehicle has reached a stationary position, it is required that the brakes be applied and that the transmission gear switch be in a neutral position. In certain cases, it may be desired to eliminate either one of those particular control devices and/or to utilize another type of control switch that is responsive to the velocity of the school bus. Hence, it is understood that the safety interlock system of the present invention has the potential to reduce school bus related injuries and fatalities.

With respect to the driver actuated switch 50, it should be pointed out that it is preferable for the same to be located about the left-hand side of the driver station 44. This enables the driver to maintain a balanced sitting position and makes it convenient to view the rearview mirrors, especially the left-hand outside rearview mirror.

The terms "upper", "lower", "forward", "rearward", etc., have been used herein merely for the convenience of the foregoing specification and in the appended claims to describe the safety interlock system for a school bus door or the like and its parts as oriented in the drawings. It is to be understood, however, that these terms are in no way limiting to the invention since the safety interlock system for a school bus door or the like may obviously be disposed in many different positions when in actual use.

The present invention, of course, may be carried out in other specific ways than those herein set forth without departing from the spirit and essential characteristics of the invention. The present embodiments are, therefore, to be considered in all respect as illustrative and not restrictive, and all changes coming within the meaning and equivalency range of the appended claims are intended to be embraced therein.

What is claimed is:

1. A safety actuating control system for locking and unlocking a handle operatively connected to a door of a vehicle such as a bus or other type of passenger vehicle wherein said handle is movable between closed and opened positions, said safety actuating control system comprising: an electrical circuit operatively connected to a power supply point of said vehicle and electrically connected to a locking mechanism operatively associated with said handle and operative to lock said handle in said closed position in a locked mode of operation and to release the handle in an unlocked mode of operation, said locking mechanism including an electrically actuated locking pin that is movable between a locked position where said pin effectively holds said handle in a closed position and an unlocked position where said handle is free to be moved between said opened and closed positions; an array of control switch means operatively connected in said electrical circuit for actuating said locking mechanism and causing said locking pin thereof to be moved from said locked position to an unlocked position in response to each of said array of control switch means being simultaneously actuated; said array of control switch means including a first control switch means operatively connected in said electrical circuit and actuated in response to said vehicle assuming a stationary condition and thereby assuring that said locking mechanism cannot be unlocked with respect to said handle unless the vehicle is stationary; a second manually actuated control switch means operatively connected in said electrical circuit and disposed within the hand reach access of the vehicle driver such that the driver can actuate the same, thereby assuring that said locking mechanism cannot be unlocked unless said second control switch means is actuated by said driver; a third manually actuated control switch means disposed at a distance from said second manual actuated control switch means and out of the reach of said driver such that a second person is required to actuate the same and thereby assuring that said locking mechanism cannot be actuated unless said third control switch means is actuated by a person other than the driver; and an override mechanism associated with said locking mechanism for allowing said locking mechanism to be disassociated from said handle in order that said handle can be manually operated without regard to said safety actuating control system.

2. The safety actuating control system of claim 1 wherein said first control switch means includes control means responsive to the application of the brakes of said vehicle in order to actuate and close said first control switch means.

3. The safety actuating control system of claim 2 wherein said first control switch means further includes control means responsive to the transmission of said vehicle being placed in a neutral position in order to actuate and close said first control switch means.

4. The safety actuating control system of claim 2 wherein said third switch control means includes first and second separate switches electrically connected in parallel relationship such that the actuation of either switch is effective to actuate and close said third switch control means, one of said switches being disposed in close vicinity to the vehicle door about the inside of the vehicle, while said other switch is disposed exteriorly of the vehicle in close vicinity of the vehicle door, whereby a passenger entering or exiting from the vehicle can actuate said third control switch means.

5. The safety actuating control system of claim 2 wherein there is provided means within said electrical circuit and operatively connected to said override mechanism and responsive thereto for effectively killing the engine of said vehicle and prohibiting the starting up thereof when said override mechanism is actuated so as to disassociate said locking mechanism from said handle.

6. The safety actuating control system of claim 5 wherein there is provided signal means associated with said vehicle and responsive to the opening of the door of said vehicle for appraising individuals within the vicinity of said vehicle that the door thereof is in an open position.

7. The safety actuating control system of claim 6 wherein said signal means includes a light disposed about the exterior of said vehicle.

8. The safety actuating control system of claim 7 wherein said signal means further includes an audible alarm means for signaling to the driver and others within said vehicle that said door is open.

9. The safety actuating system of claim 8 wherein said locking means includes a solenoid unit operative to actuate said locking pin back and forth between said locked and unlocked positions, and wherein there is provided a locking tongue that is secured to said handle and which projects therefrom and includes an opening therein for receiving said locking pin; and wherein said override mechanism includes a base support member, a carrier plate having said solenoid unit secured thereto and movably mounted to said support member, and a latching member disposed adjacent said carrier plate and effective to hold the same in an operative position, whereby the safety actuating control system can be overridden by releasing said latching member so that said carrier plate can be moved to an inoperative position, thereby overriding said safety actuating control system.

10. The safety actuating system of claim 9 wherein said carrier plate includes an opening formed therein and wherein said solenoid unit is fixed to said carrier plate above said opening such that said locking pin projects downwardly through said opening; and wherein in said closed position, said handle assumes a position adjacent said carrier plate and wherein said locking tongue thereof projects adjacent said carrier plate such that the opening therein aligns with said locking pin when said handle assumes said closed position.

11. The safety actuating control system of claim 10 wherein said support member of said override mechanism includes a generally flat plate that is generally disposed below and parallel to said carrier plate when said carrier plate assumes an operative position; and wherein said locking tongue extending from said handle is adapted to project generally between said carrier plate and said horizontal plate of said support member; and wherein said carrier plate includes a latching edge that is adapted to engage an upstanding latching post that is secured to said horizontal plate and which extends upwardly therefrom.

12. A safety actuating control system for locking and unlocking a handle operative connected to a door of a vehicle such as a bus or other type of passenger vehicle wherein said handle is movable between closed and opened positions, said safety actuating control system comprising: a door handle having a locking tongue secured thereto and extending therefrom and provided with an opening formed therein; an electrical circuit operatively connected to a power supply point of said vehicle and electrically connected to a locking mechanism operatively associated with said handle and operative to lock said handle in said closed position in a locked mode of operation and to release the handle in an unlocked mode of operation, said locking mechanism including an electrically actuated locking pin that is movable between a locked position where said pin extends into the opening of said locking tongue and effectively holds said handle in a closed position and an unlocked position where said pin is retracted from said opening and said handle is free to be moved between said opened and closed positions; an array of control switch means operatively connected in said electrical circuit for actuating said locking mechanism and causing said locking pin thereof to be moved from said locked position to an unlocked position in response to each of said array of control switch means being simultaneously actuated; said array of control switch means including a first control switch means operatively connected in said electrical circuit and actuated in response to said vehicle assuming a stationary condition and thereby assuring that said locking mechanism cannot be unlocked with respect to said handle unless the vehicle is stationary; a second manually actuated control switch means operatively connected in said electrical circuit and disposed within the hand reach access of the vehicle driver such that the driver can actuate the same, thereby assuring that said locking mechanism cannot be unlocked unless said second control switch means is actuated by said driver; and an override mechanism associated with said locking mechanism for allowing said locking mechanism to be disassociated from said handle in order that said handle can be manually operated without regard to said safety actuating control system, said override mechanism including mounting means for supporting said locking mechanism thereon and means for moveably mounting said mounting means between operative and inoperative positions with respect to said handle when disposed in the locked position.

13. The safety actuating control system of claim 12 wherein said first control switch means includes control means responsive to the application of the brakes of said vehicle in order to actuate and close said first control switch means.

14. The safety actuating control system of claim 13 wherein there is provided means within said electrical circuit and operatively connected to said override mechanism and responsive thereto for effectively killing the engine of said vehicle and prohibiting the starting up thereof when said override mechanism is actuated so as to disassociate said locking mechanism from said handle.

15. The safety actuating system of claim 8 wherein said locking mechanism includes a solenoid unit operative to actuate said locking pin back and forth between said locked and unlocked positions.

* * * * *